March 27, 1928.  
J. F. KAMEN  
WIREWORKING MACHINE  
Filed July 11, 1923

Witness  
Martin H. Olsen

Inventor  
John F. Kamen  
By [signature]  
Atty.

March 27, 1928.
J. F. KAMEN
1,663,663
WIREWORKING MACHINE
Filed July 11, 1923
3 Sheets-Sheet 2
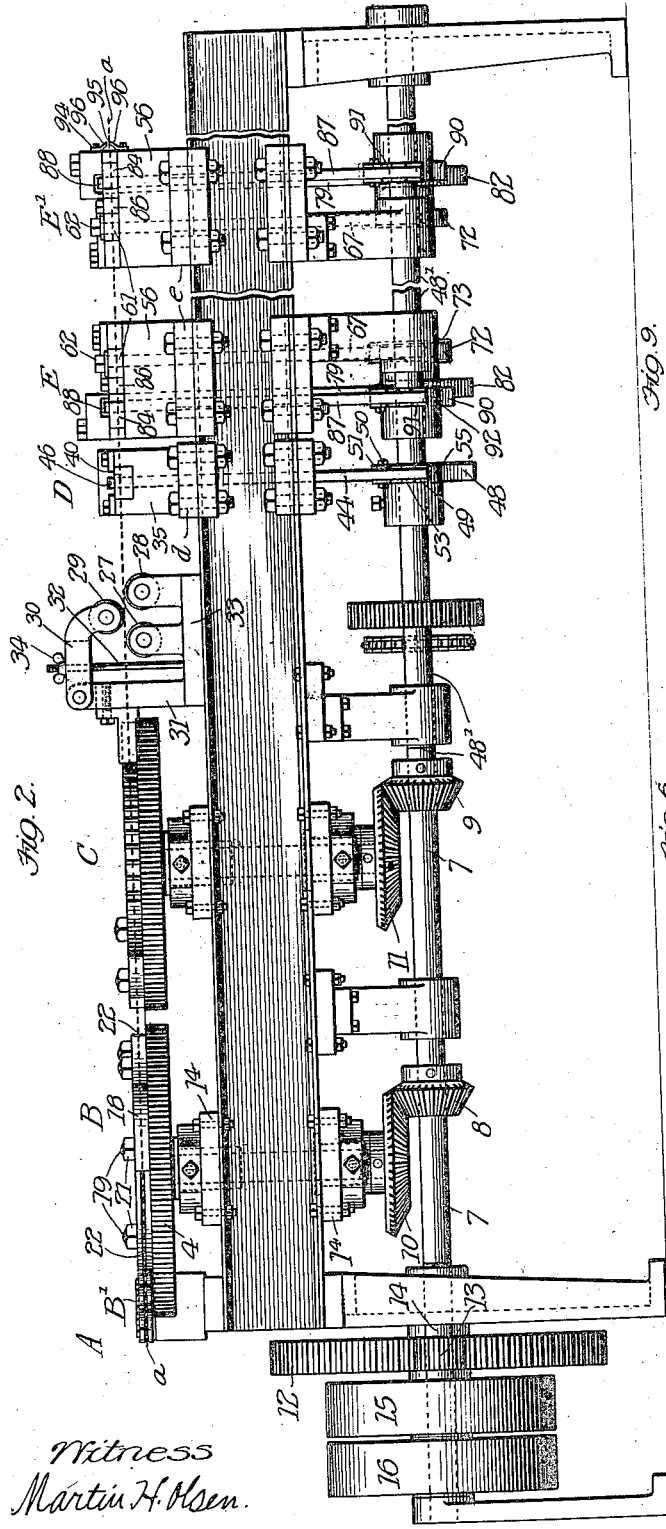
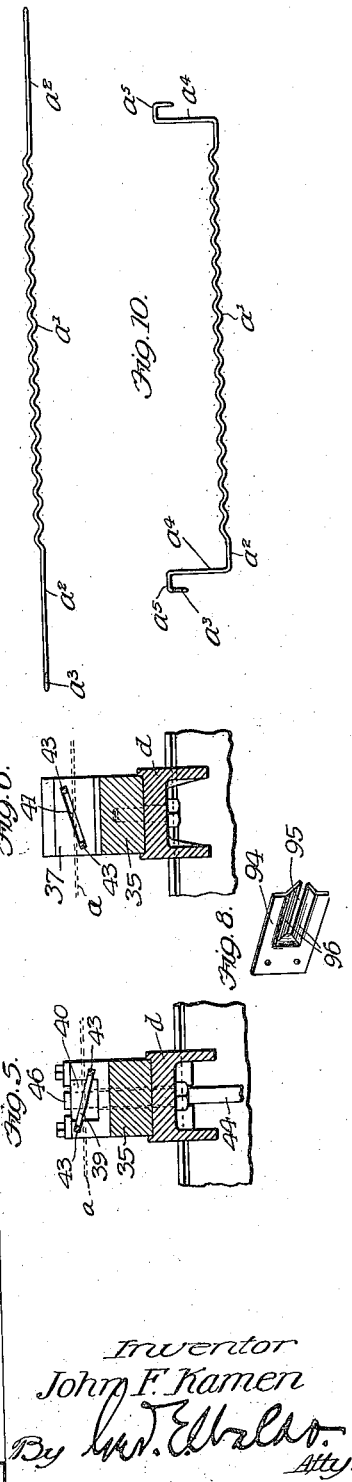
Witness
Martin H. Olsen.
Inventor
John F. Kamen
By Geo. E. Waldo.
Atty.

March 27, 1928.
J. F. KAMEN
WIREWORKING MACHINE
Filed July 11, 1923
1,663,663
3 Sheets-Sheet 3
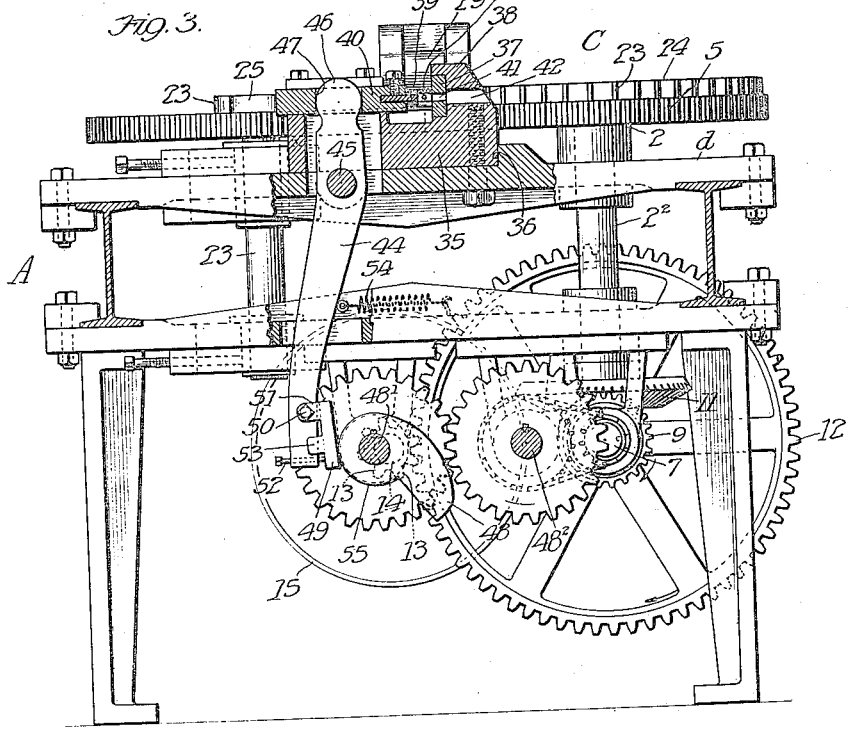
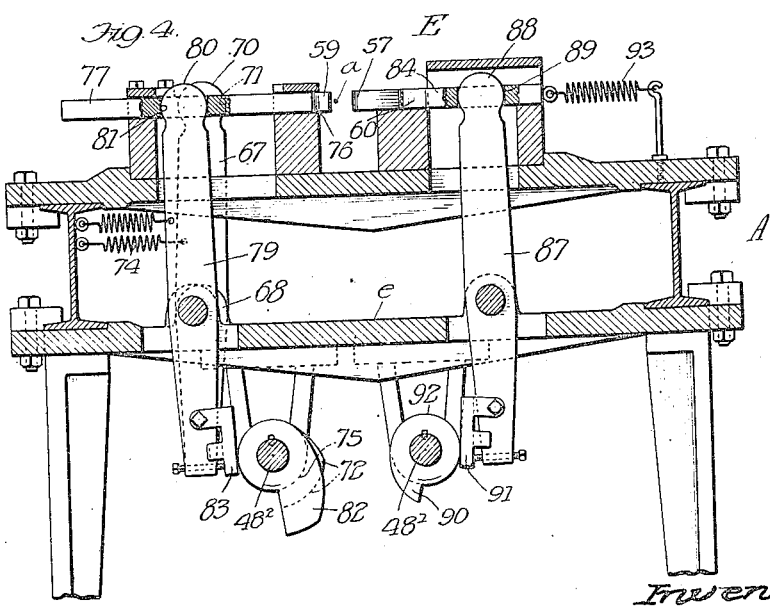
Inventor
John F. Kamen
Witness
Martin H. Olsen Patented Mar. 27, 1928.

1,663,663

UNITED STATES PATENT OFFICE.

JOHN F. KAMEN, OF RIVER FOREST, ILLINOIS.

WIREWORKING MACHINE.

Application filed July 11, 1923. Serial No. 650,791.

This invention relates to wire working machines and relates particularly to machines for making what are known to the trade as "hook-wires".

Hook-wires for making which machines embodying my invention and improvements are designed, form parts of the framework of springs for davenports, chairs, and other furniture, consisting of helical springs firmly bound together, said hook-wires forming the supports for the springs and comprising means for attaching the springs to the frames of the davenports, chairs, and other furniture. Specifically said hook-wires, one of which is shown in Fig. 10 of the drawings, consist of intermediate crimped sections, drop sections at both ends of said crimped sections, and hooks at the extreme ends of said drop sections, the bends forming the crimped sections, the drop sections, and the hooks at the ends thereof being all arranged substantially in a common plane. The drop sections of said hook-wires are for the purpose of giving desired depth to the spring and the hooks at the upper ends thereof provide means for attaching the hook-wires to the frames of davenports, chairs, and other furniture, being preferably pointed and in use being driven into the frame of the furniture.

The object of the present invention is to provide a machine of improved and simplified construction for making hook-wires of the type specified, which will be effective for its designed purpose, simple, strong and durable.

To this end, a wire working machine of my invention contemplates the various features, combinations of features and details of construction hereinafter described and claimed.

In the accompanying drawings, in which a wire working machine of my invention is fully illustrated:—

Fig. 2 is a side view thereof from the lower side of Fig. 1;

Fig. 3 is a sectional elevation on the line 3—3 of Fig. 1;

Fig. 4 is a sectional elevation on the line 4—4 of Fig. 1;

Figure 1:
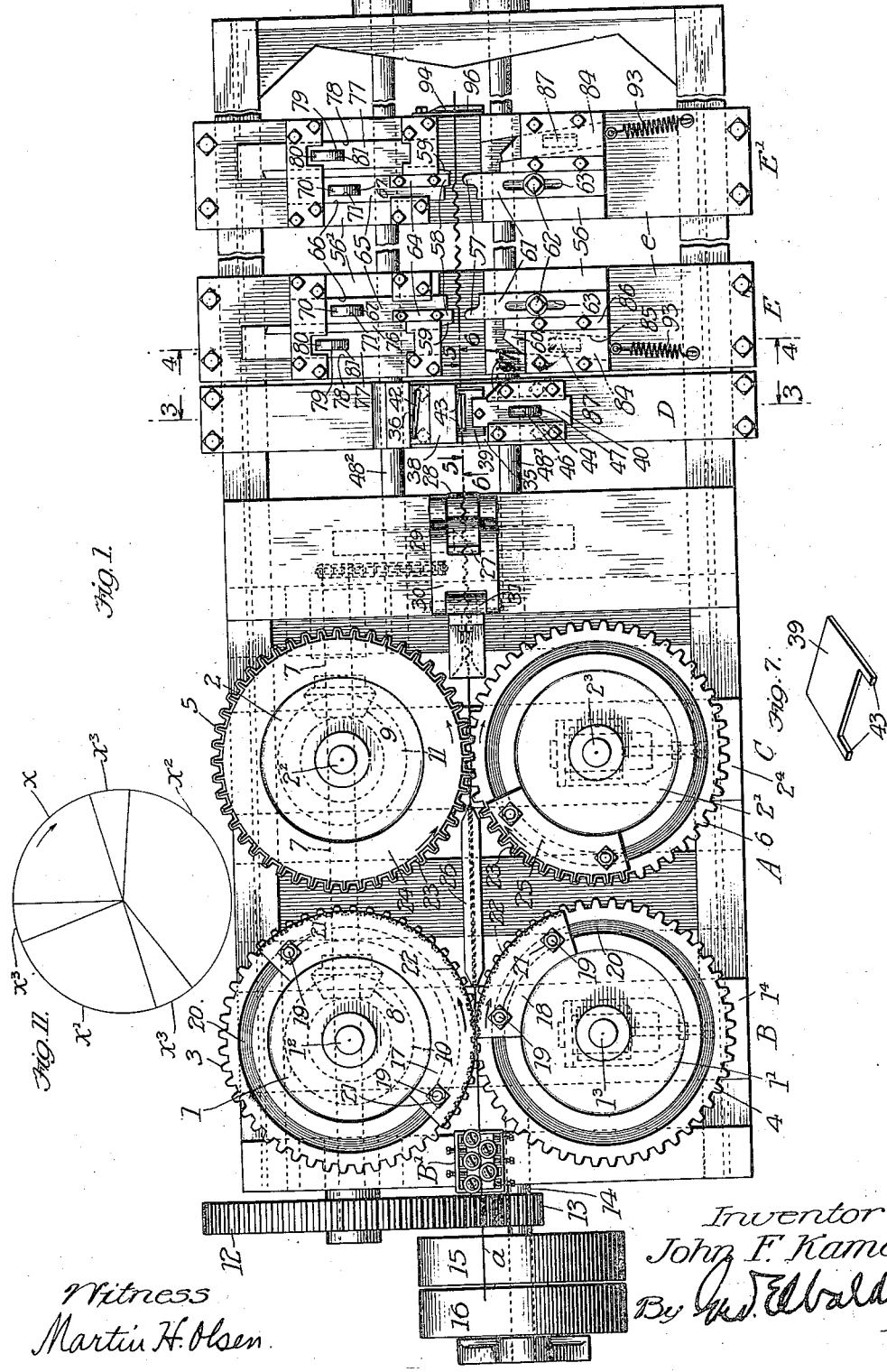
Fig. 1 is a top plan view of the machine.

Figs. 5 and 6 are sectional views of the cutoff unit taken on the line 5—5 of Fig. 1, looking in the directions indicated, respectively, by the arrows 5—5 and 6—6;

Fig. 7 is a detached perspective view of the reciprocating cutting die;

Fig. 8 is a detached perspective view of a guide adapted for presenting the blanks to the bending mechanism in proper position;

Fig. 9 is an enlarged side view of a blank for forming a hook-wire before it is bent;

Fig. 10 is a view corresponding to Fig. 9, of a hook-wire after the blank has been bent to form the drop sections and hooks thereof; and Fig. 11 is a diagrammatic view illustrating the manner of setting and timing the different constituent units of the machine.

The operating parts of my improved machine are mounted on a framework designated as a whole A, and comprising a feeding unit designated as a whole B, a crimping unit designated as a whole C, a cutoff unit designated as a whole D, and duplicated left and right-hand bending units designated as a whole E, E', respectively.

The feeding unit B comprises feed rolls 1, $1^1$ mounted at the upper ends of upright shafts $1^2$, $1^3$, rotatably mounted in suitable bearings on transverse frame members $1^4$, preferably in such manner as to permit limited relative adjustment of said feed rolls towards and from each other, to adapt the machine for operating on wires of different sizes.

The crimping unit C comprises crimping rolls 2, $2^1$ which are secured to the upper ends of upright shafts $2^2$, $2^3$, rotatably mounted in suitable bearings in transverse frame members $2^4$, preferably so as to permit limited relative adjustment of said crimping rolls towards and from each other, as in the case of the feed rolls.

The feed roll shafts $1^2$, $1^3$ and the crimping roller shafts $2^2$, $2^3$, are, respectively, positively connected so as to rotate together by sets of gears 3 and 4 and 5 and 6, which are rigidly secured to the upper ends of said shafts and, in operation, said feed roll and crimping roll shafts are positively driven by suitable driving connection with a source of power, comprising a shaft 7 rotatably mounted in suitable bearing brackets on the machine frame, beveled pinions 8 and 9 secured to which intermesh with beveled gears 10 and 11 secured, respectively, to the feed and crimping roll shafts $1^2$, $2^2$. Said driving connection also comprises a gear 12 secured to the shaft 7 which is driven by a pinion 13 secured to a stub-shaft 14 rotatably mounted in suitable supporting bearings at the end of the machine, said stub-shaft 14 being driven from a source of power by means of a belt (not shown), applied to pulleys on said stub-shaft, comprising tight and loose pulleys 15 and 16.

The gears 3 and 4 which connect the feed roll shafts $1^2$, $1^3$, form, in effect, the body portion of the feed rolls, and feeding of the wire, indicated at $a$, is effected by means of segments 17 and 18 secured to the upper sides of said gears, respectively, concentric with the feed roll shafts $1^2$, $1^3$, so as to be angularly adjustable thereon. As shown, the means for securing the segments 17 and 18 to said gears consists of clamping bolts 19, the heads of which are confined in circular T-grooves 20 formed in the upper surfaces of said gears concentric with the feed roll shafts. Said bolts project upwardly through holes formed in the segments 17 and 18 and threaded to the upper ends thereof are clamping nuts 21 adapted for drawing said segments into strong frictional engagement with the surfaces of the gears 3 and 4 to which they are secured, respectively.

The wire $a$, which is preferably drawn from a reel (not shown) passes between the segments 17 and 18, running in grooves 22 formed in the perimeters thereof, and feeding of the wire is effected by frictional engagement of said segments with said wire, in a usual manner.

The feed rolls rotate in the direction indicated by the arrows in Fig. 1, so that with the construction described, the wire $a$ will be fed intermittently, the length of the feed being regulated and controlled by the overlap of the segments 17 and 18. Thus, by varying the relative angular adjustment of said segments to increase or decrease their overlap, it is obvious that the length of wire fed at each revolution of the feed rolls may be adjusted as desired.

Crimping of the wire is effected by means of teeth 23 formed on a disk 24 and on a segment 25 secured to the gears 5 and 6, respectively, in a familiar manner, the length of the crimped sections of wire being determined by the length of the arc of the segment 25. Said segment 25 is secured to the gear 6 in substantially the same manner as the segments 17 and 18 are secured to the gears 3 and 4. Thus, to vary the length of the crimped sections of the wire, it is merely necessary to substitute for one crimping segment 25 another of different length, either longer or shorter, as it is desired to increase or decrease the length of said crimped sections.

In the operation of the machine, the wire $a$ is fed in part by the feed segments 17 and 18 and in part by the crimping disk and segment 24 and 25, the feed segments 17 and 18 feeding the straight sections of the hook-wires, and the crimping disk and segment feeding the crimped sections thereof. Obviously, however, it will require more wire to form a crimped section than to form a straight section of the same over-all length. Thus, with feeding and crimping rolls of the same operative size, the wire will be fed faster by the crimping than by the feeding rollers and, in order that said feeding and crimping rollers shall not work against one another, they are proportioned and adjusted so that they will operate alternatively, each completing its operation during the time that the other is inactive at each full revoultion of the feeding and crimping rolls. Also, to prevent the spring of the wire from advancing or retracting the wire when both the feeding and crimping rolls are inactive, my improved machine preferably comprises a tension device indicated at $B^1$, adapted to prevent "jumping" of the wire when released from both devices. A tension device suitable for the purpose can readily be devised by persons of ordinary mechanical skill, and the same need not, therefore, be shown or described in detail.

To adapt the machine for operating on wire of different size or gage, both the feed and the crimping roll shafts are relatively adjustable towards and from each other.

Between the feed rolls and crimping rolls, the wire $a$ is confined in a suitable fixed guide indicated at 26.

From the crimping rolls, the wire passes to a straightening device which, as shown, consists of three rolls comprising two lower rolls 27 and 28 rotatably mounted in fixed bearings and an upper roll 29 positioned between the rolls 27 and 28 and adjustable towards and from the same. As shown, the roll 29 is rotatably mounted at the end of an arm 30 pivoted to the upper ends of standards 31, the position of which relative to the lower rolls 27 and 28 is adjustably defined and maintained by a rod 32 secured in a base 33 on which the straightening rolls are mounted, said rod 32 extending upwardly through a hole formed in the arm 30 and threaded to the projecting upper end of which is a nut 34 adapted to bear against the upper side of said arm 30.

From the straightening device, the crimped wire passes to the cutoff device D, which forms a separate unit and is mounted on a transverse frame member $d$ which is adapted to be adjusted bodily towards and from the crimping unit C to provide for varying the lengths of the blanks, as may be desired.

Said cutoff device D comprises a base block 35 secured to the transverse frame member $d$, the rear end of which abuts against a shoulder 36 on said frame member.

The cutoff device D comprises a fixed die 37 mounted on the face of an upward extension 38 formed on the base block 35 and a die 39 secured in a slide 40 mounted to reciprocate in suitable guide bearings on the base block 35 of said cutoff device.

In the operation of the machine the wire $a$ is fed between the fixed die 37 and the reciprocating die 39, which are preferably constructed and arranged to sever the wire $a$ on an angle to the line of the wire so that the severed ends thereof will be pointed or beveled, to provide for conveniently driving the hooks at the ends of the hook-wires into the wooden frame of the furniture on which the springs are to be used. As shown, this is effected by mounting the reciprocating die 39 at an angle to the wire, as best shown in Figs. 5 and 6, the fixed die 37 being provided with an opening 41, which the reciprocating die is adapted to enter on its advancing stroke, said opening being positioned at a corresponding angle to the line of the wire as the reciprocating die 39. With this construction it is obvious that a short length will be cut from the wire $a$ at each cutting operation, and to provide for discharging said pieces the opening 41 extends entirely through the fixed die 37 and communicates with an enlarged opening 42 formed through the upward extension 38 of the base block on which said fixed die is supported. In operation, also, the reciprocating die 39 is maintained in alinement with the opening 41 in the fixed die 37 by marginal projections 43 at the front end of the reciprocating die 39, which are at all times in engagement with the opening 41 in said fixed die and are slidably fitted thereto. The wire $a$ passes through the opening defined by said marginal projections 43, the relation being such that the clear opening in the line of the wire defined by said marginal projections will be only slightly greater than the diameter of the wire, as best shown in Figs. 5 and 6. With this construction said marginal projections 43 in addition to maintaining the reciprocating die 39 in operative register with the opening 41 of the fixed die 37, will also form a guide adapted to maintain the wire $a$ in operative alinement.

In the operation of the machine reciprocating movement is imparted to the slide 40 by means of a lever 44 pivoted to a pin 45 secured to the transverse frame member $d$. Formed on the upper end of said lever 44 is a head 46 which is fitted to an opening 47 in the slide 40, said head being circular so that it will fit the opening 47 in all pivotal positions of the lever 44.

Oscillation is adapted to be imparted to the lever 44 by a cam 48 secured to rotate with a shaft $48^1$ rotatably mounted in brackets which depend from transverse frame members to which rotation in the direction indicated by the arrow, Fig. 3, is imparted by driving connection with the main shaft 7 of the machine, such driving connection comprising a second shaft $48^2$, also mounted to rotate in brackets which depend from transverse frame members, and gears which connect said shafts in train with the main driving shaft 7, the relation being such that the shaft $48^1$ and $48^2$ will be driven at the same speed.

The cam 48 impinges upon the lower end of the lever 44 as the shaft $48^1$ rotates, and to provide for adjusting the position of the reciprocating die 39 relative to the fixed die 37, a shoe 49 is adjustably mounted at the lower end of the lever 44 against which the cam 48 impinges directly. As shown, the shoe 49 is pivotally connected at its upper end to the lever 44 by means of a bolt 50 which extends through holes formed in said lever and in lugs 51 on the shoe 49 which embrace opposite sides of said lever. The shoe 49 is adapted to be adjusted pivotally by means of an adjusting screw 52 which has screw-threaded engagement with a hole in the lever 44 and which bears against the inner surface of the shoe 49 adjacent to its free end. Lateral displacement of the shoe 49 is prevented by means of lugs 53 thereon, which embrace opposite sides of the lever 44.

A spring 54 applied to the lever 44 maintains the slide 40 and thus the reciprocating die 39 normally retracted and the bearing surface of the shoe 49 in contact with the cam 48. As shown, said cam comprises a circular section 55 which forms a stop adapted to limit the pivotal movement of the lever 44 to retract the reciprocating die 39, the relation being such that the marginal projections 43 on the reciprocating die 39 will at all times be in engagement with the slot 41 in the fixed die 37.

The cutoff unit D is mounted in such position relative to the crimping unit C that the wire $a$ will be severed at points substantially at the centers of the straight sections of wire between adjacent crimped sections thereof, thus producing blanks of substantially the same shape and length, which will be symmetrical on both sides of their longitudinal centers.

In Fig. 9 of the drawings I have shown a blank as it will appear when cut off and before the end sections thereof are bent to form the finished hook-wire, $a^1$ designating the intermediate crimped section of the blank, and $a^2$ the straight end sections thereof, the ends of which are oppositely beveled or inclined, as shown at $a^3$. To form the finished hook-wire shown in Fig. 10, the straight end sections $a^2$ of the blank are bent by successive operations to form the drop sections, designated $a^4$, and the hooks designated $a^5$.

As shown, the bending of the straight end sections $a^2$ of the blank is effected by the bending units E, E$^1$, which, as previously stated, are left and right hand duplicates of each other, respectively adapted to operate on the straight sections $a^2$ at opposite ends of the blank. Said bending units will now be described, but, as they are duplicates of each other a description of one will apply equally to both and the accompanying description is, therefore, in the singular.

The operative parts of each bending unit are mounted upon base blocks 56, 56$^1$, each secured to a transverse frame member $e$, which is adjustable lengthwise of the machine with reference both to the other bending unit and also with reference to the cutoff unit D, to provide for securing said bending units in position for operation on blanks of different lengths. As shown, the operative parts of each bending unit comprise clamping jaws 57 and 58 adapted for holding the blanks firmly in position during the bending operation, a bending die 59 adapted to co-operate with the clamping jaw 57 to form a drop section $a^4$ of the hook-wire, and a bending die 60 adapted to co-operate with the bending die 59, when at the limit of its advancement, to form a hook $a^5$ at the end of the drop section $a^4$ for securing the hook-wire to the frame of the piece of furniture to which the spring is to be attached.

The clamping jaw 57 is stationary and consists of a rounded projection or nose formed at the inner end of a bar 61 slidably fitted to a guide bearing formed in the base block 56, the means for securing said bar in position being constructed and arranged to provide for adjusting the clamping jaw 57 towards and from the opposed clamping jaw 58. As shown, the means for securing said bar 61 in position consists of a clamping screw 62 which extends through a slot 63 formed through the bar 61 and has screw-threaded engagement with a hole formed in the base block 56 on which said stationary clamping jaw is mounted.

The clamping jaw 58 preferably consists of a steel or other hard metal bar 64 removably secured to a slide 65 fitted to a guide bearing 66 formed in the base block 56$^1$. Provision is thus made for renewing said clamping jaw 58 in case it becomes broken or worn in use. My invention, however, contemplates equally making said jaw integral with the slide 65, if desired.

In operation, reciprocating movement is imparted to the slide 65 which carries the movable clamping jaw 58, by means of a lever 67 pivoted to a lug 68 on the transverse frame member $e$, the upper end 70 of which is circular and is fitted to an opening 71 formed in the slide 65. Oscillation is adapted to be imparted to the lever 67 by means of a cam 72 secured to the cam shaft 48$^2$, which is adapted to impinge upon the lower end of the lever 67.

In the preferable construction shown, the cam 72 impinges directly upon a shoe 73 adjustably secured to the lower end of the lever 67 in substantially the same manner as the shoe 49 is secured to the lever 44 which operates the slide 40 of the cutoff unit D, as heretofore described. The shoe 73 is also removable, thus providing for renewing the same in case of wear and also providing means for adjusting the position of the movable clamping jaw 58 relative to the fixed clamping jaw 57 to secure designed co-action of said jaws in operation.

The lever 67 is maintained normally in pivotal position corresponding to retraction of the movable clamping jaw 58 by means of a spring 74 applied thereto, said spring also operating to maintain the shoe 73 secured to the lower end of said lever in contact with the cam 72, said cam preferably comprising a circular section 75 which limits the retraction of the slide 65 and thus of the movable clamping jaw 58.

As shown, the bending jaw 59 which co-acts with the fixed clamping jaw 57 to form a drop section $a^4$ of the hook-wire, is formed on a bar 76 preferably made of steel or other suitable hard metal, detachably secured to a slide 77 fitted to reciprocate in a guide bearing 78 formed in the base block 56$^1$.

In the preferable construction shown, the guide bearings 66 and 78 for the slides 65 and 77 are continuous with each other, the adjacent sides of said slides resting directly in contact with each other and their aggregate widths being equal to the aggregate widths of the guide bearings 66 and 78.

In the operation of the machine reciprocating movement is adapted to be imparted to the slide 77 by means of a lever 79 pivoted between its ends to the transverse frame member $e$, a circular head 80 on the upper end of which is fitted to an opening 81 formed in said slide 77. Oscillation is adapted to be imparted to the lever 79 by means of a cam 82 secured to the cam shaft 48$^2$, which impinges upon the lower end of said lever, said cam 82 impinging directly upon a shoe 83 removably secured to the lever 79, said actuating means—excepting as to proportions—being in all respects substantially identical in construction and principle of operation with the means for actuating the slide 65 which carries the movable clamping jaw 58.

The bending die 60, which co-acts with the bending die 59, when in its position of extreme advancement, to form the hook $a^5$ of the hook-wire is formed by the inner corner of a slide 84 fitted to reciprocate in a guide bearing 85 formed in the base block 56, said guide bearing 85 and thus the slide 84 being preferably arranged at a slight angle to the slide 77 and its bearing, the relation being such that the die 60 will bend the extreme end of the hook $a^5$ so that it will form what may be designated as a re-entrant angle to the transverse section of the hook which connects it with the drop section $a^4$ of the hook-wire, the angular divergence of said slide 84 from parallelism with the slide 77 being only sufficient to compensate for the spring of the wire from which the hook-wire is formed so that, when the hook-wire is released, the spring of the hook will return it to a position substantially perpendicular to the general line of the intermediate section of the hook-wire. As shown, the adjacent sides of the guide bearings for the slides 84 and the bar 61 on which the stationary clamping jaw 57 is formed, are formed by a block 86 removably secured to the base block 56, the inner end of which terminates in such relation to the end of the bending die 59 that, as said bending die 59 advances to form the drop sections $a^4$ of the hook-wire, the extreme end of the blank will be forced into the corner or angle formed by the inner end of said block 86 and the adjacent side of the slide 61 which carries the fixed clamping jaw 57 thereby bending the extreme end of the hook-wire blank so that it will extend substantially at right angles to the drop section $a^4$ thereof, and will project a sufficient distance over the guide bearing 85 for the bending die 60 to form the end portion of the hook $a^5$, which will be bent back by the bending die 60 as the slide 84 advances into substantial parallelism with the drop section $a^4$.

As shown, reciprocating movement is adapted to be imparted to the slide 84 by means of a lever 87 pivoted to the transverse frame member $e$, a circular head 88 on the upper end of which is fitted to an opening 89 in said slide bar and to which oscillating movement is adapted to be imparted, in operation, by means of a cam 90 secured to the cam shaft $48^1$, which impinges upon a shoe 91 adjustably secured to the lower end of the lever 87, all in a manner substantially identical with the means for imparting reciprocating movement to the slide 77 which carries the bending die 59. Also, the lever 87 is adapted to be maintained in pivotal position corresponding to retracted position of the slide 84 and bending die 85, with its lower end resting in contact with a circular section 92 of the cam 90 by means of a spring 93 which connects said slide with a rigid part of the machine frame.

To prevent binding of the lever 87 in the opening 89 in the slide 84 due to the angular movement of the slide 84, the opening 89 is made sufficiently wider than the thickness of the circular head 88 on the lever 87 to provide necessary clearance between the sides of said lever and opening in all pivotal positions of said lever.

In the operation of the machine, the blanks for forming the hook-wires are presented to the bending units E, $E^1$, before they are severed from the wire $a$ by the cutoff unit D, said cutoff and bending units being secured to the machine frame in such positions relative to each other, that when a blank is in position to be severed from the wire by the cutoff unit, it will also be in proper position to be operated upon by the bending units.

With the construction shown and described, it is obvious that a blank will be formed by the feeding and crimping rolls and presented to the cutoff and bending dies so as to form a finished hook-wire, at each complete revolution of the feed and crimping rolls and that, to effect this end, it is necessary that the gear ratios for driving the feed and crimping rolls and the cam shafts shall be such that all of said shafts will be driven at the same speed.

Also, as the feed roll, crimping roll and cam shafts are rotated continuously and, as it is necessary that the blanks shall be stationary during the operation of the cutoff and bending units, it is obvious that the feed and crimping rolls must be of sufficient size and the feeding segments 17 and 18 and the crimping segment 25 so proportioned that the aggregate lengths of the arcs of the feeding and crimping rolls occupied by the overlapping portions of the feeding segments 17 and 18 and by the crimping segment 25, shall be sufficiently shorter than the full circumference of the circles of which said feeding and crimping segments form arcs, and shall be arranged in such relation to each other, that the wire $a$ will be released from the operation of said feeding and crimping segments during an interval corresponding to rotation of the cam shafts $48^1$, $48^2$, through arcs of sufficient lengths to permit the actuation of the clamping jaws and of the cutoff and bending dies to form the finished hook-wire; the cams which actuate the clamping jaws and the cutoff and bending dies being so set and proportioned that said clamping jaws and cutoff and bending dies will be actuated during the interval that the wire $a$ is released from the feeding and crimping segments and is at rest.

Also, as previously stated, the wire will be fed by the crimping rolls faster than it is fed by the feeding rolls, and it is, therefore, necessary that the feeding and crimping rolls shall engage the wires $a$ alternately and that the wire shall be released from each during the interval that it is being fed by the other. As shown, the feeding segments 17 and 18 operate upon the wire first and the crimping segment 25 is positioned in the arc of the circle of which it is a segment, adjacent to and rearwardly from the arc of said circle corresponding to the arc of the circle of the feed rolls defined by the overlapping portions of the feeding segments 17 and 18.

In practice, the relation will preferably be such that the aggregate lengths of the arcs of the circles defined by the overlap of the feed roll and crimping segments will be approximately equal to one-half of the circumference of the circle defined thereby, respectively. Obviously, this relation will provide an interval corresponding to rotation of the feed and crimping rolls through one-half a revolution, during which the wire $a$ and the hook-wire blank attached thereto will be stationary, and the cutoff and bending dies may act, without interference by or with the action of the feed and crimping roll units.

In Fig. 11 of the drawings I have shown a typical layout of the feed, crimping, cut-off, and bending devices whereby the designed operation of my improved machine may be produced, said Fig. 11 being a superposed or composite diagrammatic view illustrating the relative arrangement and timing of the different mechanisms corresponding to the positions of the feeding and crimping devices shown in Fig. 1, in which the feeding devices have just completed their feeding operation and the operation of the crimping device is about to begin.

Said Fig. 11 is drawn to a scale in which a blank approximately 3 inches long represents the full overall length of a blank produced by the machine, the lengths of the straight end sections of the blank aggregating 1.35 inches and the length of the crimped section 1.65 inches.

On the scale assumed, the designed operation of the machine may be secured by feed and crimping rolls the effective or pitch diameters of which are approximately 2.1875 inches corresponding to a circumferential length of 6.875 inches, and the sequence of the different operations performed at each complete cycle of the machine and the time available for performing the same, respectively, being indicated by the arcs of the sectors $x$, $x^1$, and $x^2$, the arc of the sector $x$ representing the portion of the cycle during which feeding of the wire by the segments 17 and 18 occurs, the arc of the sector $x^1$ the portion of the sector during which crimping of the wire occurs, and the sector $x^2$ the portion of the cycle during which severing and bending of the blanks occurs, during which time the feeding and crimping means are inactive. The short sectors $x^3$ which separate the sectors $x$, $x^1$, and $x^2$ designate intervals between different operations in the cycle of the machine to insure that one operation will be completed before the beginning of the next succeeding operation.

The actuating cams 48, 72, 82, and 90 are preferably so proportioned that the operation of all of the devices actuated thereby, respectively, will occur during the portion of the cycle of the machine indicated by the arc of the sector $x^2$ and are set to operate in the following sequence:

1. Engagement of the cams 72 with the levers 67 which actuate the movable clamping jaws 58 to clamp the blank at the advancing end of the wire $a$ in position for operation by the severing and bending dies;

2. Engagement of the cam 48 with the lever 44 which actuates the movable cutting die 39 to sever the blank, said cam 48 being set in such relation to the cam 72 that the blank will be severed immediately following closing of the clamping jaws upon the blank;

3. Engagement of the cams 82 with the levers 79 to advance the bending dies 59 to form the drop sections $a^4$ of the hook-wire, said cams 82 being set so that bending of the blanks thereby will begin very shortly after actuation of the severing die 39; and 4. Engagement of the cams 90 with the levers 87 to advance the bending dies 60 to form the hooks $a^5$ of the hook-wires.

The cams 72 are shaped and proportioned so that the clamping dies will be held firmly in closed position during the entire blank severing and bending operations, and the cams 82 are shaped and proportioned so that the bending dies 59 will be held at the limit of their advancement during the operation of the hook-forming dies 60. Also, the cams 72, 82, and 90 are all shaped and proportioned so that the levers actuated thereby, respectively, will all be released simultaneously or subtstantially so.

To insure that the blank at the advancing end of the wire $a$ will be presented in proper position to the clamping and bending devices, a guide 94 is secured to the side of the bending unit $E^1$ remote from the severing unit D. As shown, see particularly Fig. 8, said guide consists of a plate secured to the base block $56^1$ which extends across the space between the base blocks 56, $56^1$, and is provided with a slot 95, which cuts out at the outer or unattached end of said plate, the sides of said plate adjacent to said slot being inclined or beveled, as shown at 96, the relation being such that engagement of the advancing end of the blank with the slot 95 will define the operative position of the blank relative to the clamping and bending devices, and such also that the inclined surfaces 96 will guide the advancing end of the blank into the slot 95.

With the construction described, it is obvious that when the end portion of the blank which is in engagement with the slot 95, is bent by the ending die 59 of the unit E¹ to form the drop section $a^4$ of the hook-wire, the end of the blank will pass out of engagement with the slot 95 so that the guide 94 will in no way interfere with the bending of said blank.

Also, in order that the base block 35 of the cutoff unit D shall not interfere with bending of the end of a severed blank proximate to said cutoff unit, the corner of the base block towards which the end of said blank is bent, is cut off at an angle, as shown at 97.

I claim:

1. In a wire working machine for the purpose specified, the combination of wire feeding means and wire crimping means, both said wire feeding means and wire crimping means consisting of heads arranged in pairs, shafts to which said heads are secured, respectively, said feeding heads comprising opposed circular tread portions adapted to frictionally engage the wire to be fed, and said crimping heads comprising opposed circular portions between which the wire is adapted to pass, and co-acting crimping teeth thereon, a tread portion of a feeding head and a crimping portion of a crimping head forming a segment of a circle and being supported so as to be angularly adjustable, the relation being such that said feeding means and crimping means will engage the wire separately, a driven shaft, and driving connection between said driven shaft and the shafts of said feeding means and crimping means whereby both will be driven continuously.

2. A wire working machine as specified in claim 1, in which the opposed tread portions of both feeding heads form segments of circles and are angularly adjustable.

3. A wire working machine as specified in claim 1, in which the segmental portions, both of the feeding heads and of the crimping heads, are removable.

4. In a wire working machine of the type specified, the combination of wire feeding means and wire cutting means, driving means therefor constructed and arranged for operating both said feeding and cutting means intermittently, the relation being such that each thereof will be operated separately during periods of inaction of the other, said wire cutting means forming a separate unit which is independently adjustable towards and from the feeding means to provide for varying the lengths of the pieces of wire severed from the advancing end of a strand of wire.

5. In a wire working machine of the type specified, the combination of wire feeding, cutting, and bending means, and co-ordinated actuating means therefor, respectively, the bending means including clamping means and comprising a plurality of reciprocating dies, and the clamping means comprising clamping dies one of which is movable, and the abutment about which the initial bend is made consists of a clamping die when in clamping position, a fixed shoulder opposed to the bending die which is initially operated, which defines an angle into which the blank is forced as said die moves to its position of extreme advancement, imparting a second bend to the blank.

6. A wire working machine as specified in claim 5, in which the die which performs the third bending operation is mounted at a reentrant angle to the bending die which imparts the second bend to the blank and in spaced relation thereto.

7. A wire working machine as specified in claim 5, in which the clamping die which forms the abutment about which the initial bend is made is stationary and is adjustably supported to provide for varying its position.

8. In a wire working machine of the type specified, the combination of wire feeding, cutting, and bending means, clamping means associated with said bending means, and co-ordinated actuating means for all thereof, respectively, the relation being such that said means, respectively, will be actuated in the following sequence: feeding, clamping, cutting, and bending, the clamping means being constructed and arranged to support severed blanks in operative relation to the bending means.

9. A wire working machine as specified in claim 8, in which the actuating means for the clamping means is constructed and arranged for maintaining said clamping means in clamped position during the entire bending operation.

10. A wire working machine as specified in claim 8, which also comprises a guide adapted for defining the position of the section of wire to be bent relative to the bending means, said guide consisting of a fixed plate provided with a slot which cuts out at the end of the plate towards which the wire is bent, said plate comprising inclined portions at both sides of the slot therein which converge in the direction in which the wire is fed.

In witness that I claim the foregoing as my invention, I affix my signature this 22 day of June, 1923.

JOHN F. KAMEN.